(No Model.) 2 Sheets—Sheet 1.

W. C. CROSS.
RAILWAY RAIL COUPLING OR JOINT.

No. 583,790. Patented June 1, 1897.

Witnesses:
L. C. Hills
F. B. Kenfer

Inventor:
Wm. C. Cross,
by
Marcellus Bailey
his Atty.

(No Model.) 2 Sheets—Sheet 2.
W. C. CROSS.
RAILWAY RAIL COUPLING OR JOINT.
No. 583,790. Patented June 1, 1897.
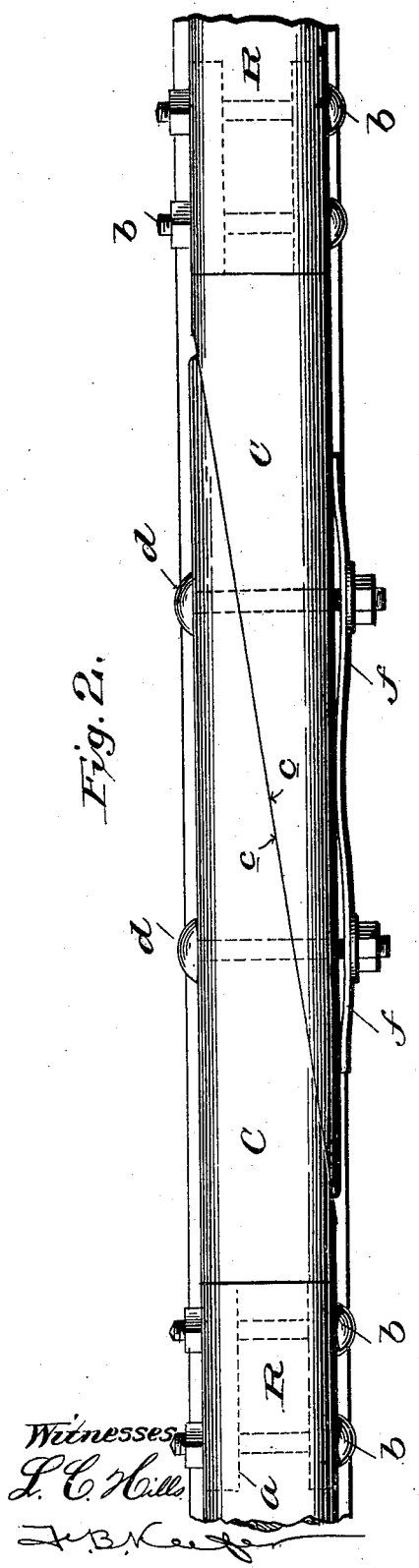
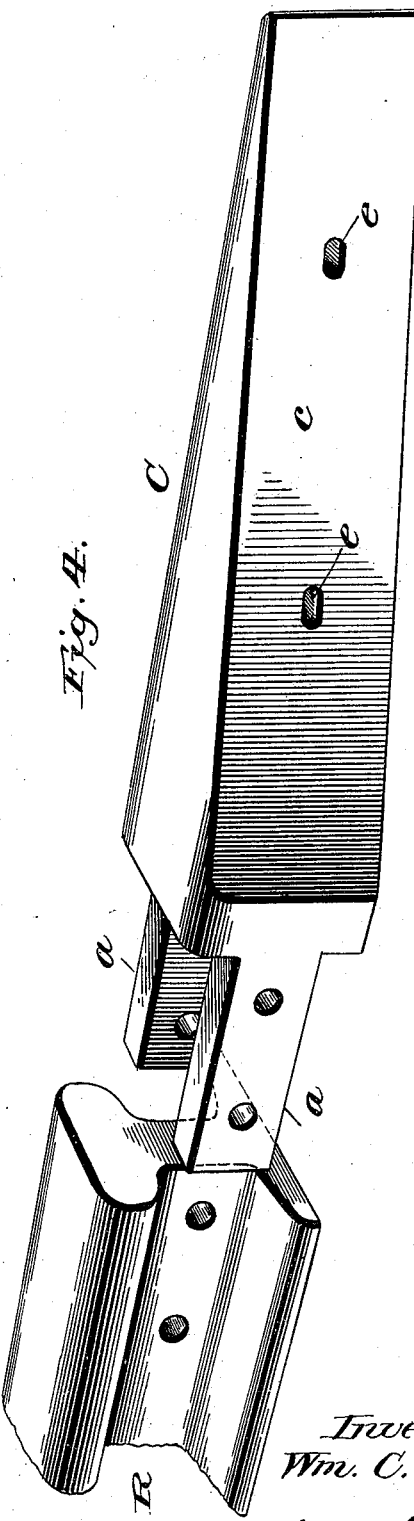
Witnesses:
Inventor:
Wm. C. Cross,
his Atty.

UNITED STATES PATENT OFFICE.

WILLIAM C. CROSS, OF BOSTON, MASSACHUSETTS.

RAILWAY-RAIL COUPLING OR JOINT.

SPECIFICATION forming part of Letters Patent No. 583,790, dated June 1, 1897.

Application filed November 17, 1894. Serial No. 529,163. (No model.)

*To all whom it may concern:*

Be it known that I, WILLIAM C. CROSS, a citizen of the United States, residing at Boston, in the State of Massachusetts, have invented a new and useful Improvement in Railway-Rail Couplings or Joints, of which the following is a specification.

The object of my invention is to prevent the pounding of the wheels of a railway-car upon the meeting ends of rails. This pounding action it is well known is due to the fact that the meeting ends of the rails are separated from one another by a short interval to allow for expansion. To remedy this difficulty various expedients have been resorted to and various forms of joints have been proposed, none of which, so far as I am informed, has proved acceptable.

It is my object to provide a cheap and simple coupling which shall be entirely efficient for the purpose, which can be readily applied and renewed, and which shall also serve to effectually protect the rail ends and prevent them from breaking down. To this end I provide a two-part coupling, one member of which is rigidly fastened to the end of one rail and the other member of which is rigidly fastened to the end of the other rail, the fastenings being bolts or the like to permit the coupling members or either of them to be removed and replaced whenever desired. In this way I provide each rail with what virtually are false ends, which protect and preserve intact the ends of the rail itself. In order to prevent pounding action, I preferably form the meeting faces of the coupling members each on a long and gentle incline, holding them together by a bolt-and-slot connection which will permit the movement of the one face upon the other due to expansion and contraction of the rails; and with these connecting-bolts I prefer to employ compensating spring or springs, which will hold together the meeting faces of the coupling members and yet permit the slight variation in the thickness of the coupling which takes place as the inclined faces move on each other.

The nature of my invention, however, and the manner in which the same is or may be carried into effect can best be understood and explained by reference to the accompanying drawings, in which—

Figure 1:
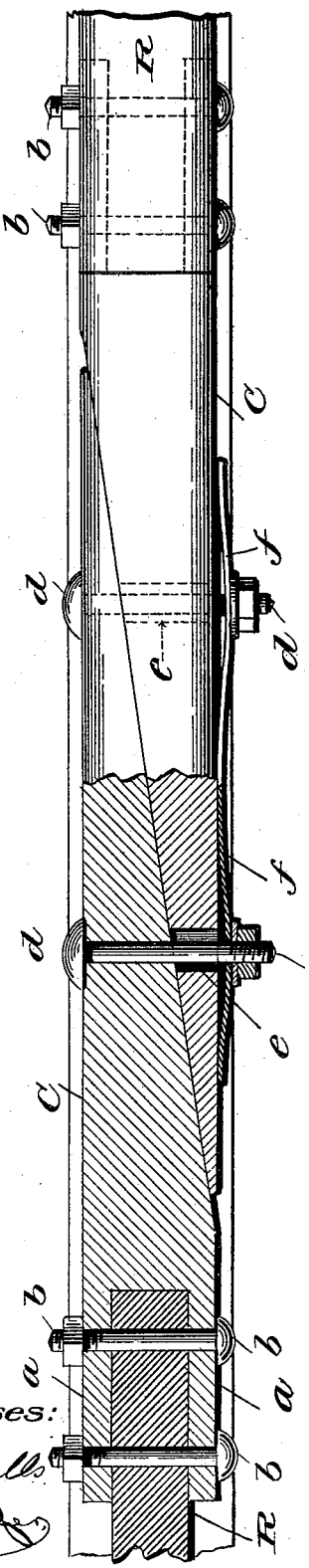
Figure 3:
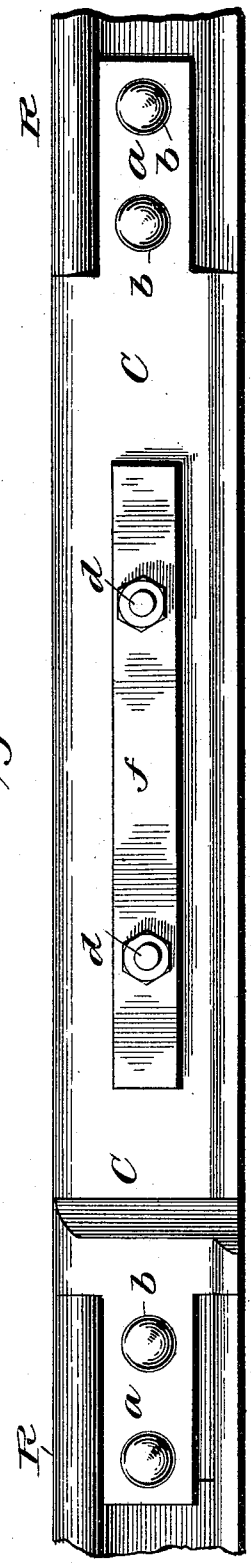

Figure 1 is a plan, partly in horizontal section, of a rail-coupling embodying my invention in its preferred form, showing the parts in the position they occupy when the rails are unexpanded. Fig. 2 is a plan showing the same parts in the position they occupy when the rails are expanded. Fig. 3 is a side elevation, and Fig. 4 is a view of the end of one rail and of its coupling member detached.

In the drawings, R R are the two rails, and C C are the two coupling members. Each member fits squarely and closely against the end of its rail and has a tread which forms a continuation of the tread of the rail, and it is secured to the rail by extensions $a$, which extend back upon and overlap the tread of the rail and are secured thereto by bolts $b$, which can pass through the two holes usually provided in the webs of ordinary rails for the fish-plate-holding bolts. In this way each rail is in effect provided with a false end accurately fitting against it with a tread forming a continuation of the rail-tread and detachably connected to said rail, so that it may be applied, removed, and replaced whenever desired. The ends of the rails and the intermediate coupling are of course to be supported in and held by a chair, (not shown,) which will prevent lateral movement or displacement of the parts.

In order to prevent pounding action, I prefer that the meeting ends of the two coupling members should be formed with flat inclined overlapping vertical meeting faces $c$, the direction of the incline being crosswise of the rail and its pitch being very gradual and gentle, so that the movement of these faces upon each other due to contraction and expansion of the rails shall not have the effect of materially varying the thickness transversely of the coupling as a whole. For example, by making the incline such that in crossing the rail from side to side it will be, say, eighteen inches in length (this being the length which at present I prefer) the movement of the faces one upon the other due to expansion and contraction of the joint will not vary the transverse thickness of the joint to exceed one thirty-second of an inch—a variation which is quite immaterial and can be taken care of easily. To hold the meeting faces together, I provide bolts $d$, which pass transversely through horizontal slots *e* in the coupling members, of such length as to permit the requisite longitudinal movement of the members upon each other, and between the heads of the bolts and the adjoining sides of the coupling members I can interpose one or more compensating springs *f* to permit variations in thickness of the coupling consequent upon the movement of its members and yet hold the meeting faces C always tightly together. The spring provision, however, while desirable, is not indispensable, and instead of two bolts *d* I may use less or more than that number.

Having described my invention and the best way now known to me of carrying the same into effect, what I claim herein as new and of my own invention is—

1. A railway-rail coupling, comprising two members, each of which fits closely against and is rigidly secured to the end of but one rail, and has a tread forming an extension of the rail-tread, as hereinbefore set forth.

2. A railroad-rail coupling comprising two members each of which fits closely against and is rigidly secured to but one rail and has a tread forming an extension of the rail-tread, the two members having vertical overlapping meeting faces held together by cross-bolts passing through horizontal slots therein, as hereinbefore set forth.

In testimony whereof I have hereunto set my hand this 16th day of November, 1894.

WILLIAM C. CROSS.

Witnesses:
NATHAN H. ROBBINS,
F. B. KEEFER.